United States Patent [19]
LeGrand et al.

[11] Patent Number: 5,489,404
[45] Date of Patent: Feb. 6, 1996

[54] PROCESS FOR ANNEALING THERMOPLASTICS

[75] Inventors: Donald G. LeGrand, Burnt Hills; George T. Seeger, Scotia, both of N.Y.

[73] Assignee: General Electric Company, Schenectady, N.Y.

[21] Appl. No.: 288,239

[22] Filed: Aug. 8, 1994

[51] Int. Cl.$^6$ .................... B29C 71/02; B29C 71/04
[52] U.S. Cl. .................... 264/481; 264/235; 264/327; 264/346; 264/490
[58] Field of Search .................... 264/25, 26, 235, 264/346, 327

[56] References Cited

U.S. PATENT DOCUMENTS

| | | | |
|---|---|---|---|
| 3,555,135 | 1/1971 | Paul | 264/235 |
| 4,127,631 | 11/1978 | Dempsey et al. | 264/554 |
| 4,128,379 | 12/1978 | Hartitz et al. | |
| 4,361,527 | 11/1982 | Rau | 264/235 |
| 4,462,947 | 7/1984 | Huggard | 264/54 |
| 4,594,204 | 6/1986 | Heidenreich et al. | |
| 4,715,999 | 12/1987 | Dislich et al. | 264/1.1 |
| 4,824,699 | 4/1989 | Woo et al. | 156/83 |
| 5,336,717 | 8/1994 | Rolando et al. | 264/331.14 |

FOREIGN PATENT DOCUMENTS

| | | | |
|---|---|---|---|
| 0450612A | 10/1991 | European Pat. Off. | 264/235 |
| 1939053 | 2/1970 | Germany. | |
| 60-18334 | 1/1985 | Japan | 264/346 |
| 60-177505 | 9/1985 | Japan | 264/346 |
| 61-211021 | 9/1986 | Japan | 264/346 |
| 937007 | 9/1963 | United Kingdom | 264/346 |

OTHER PUBLICATIONS

Encyclopedia of Polymer Science and Engineering, Volume 2, Second Edition, LeGrand, "Annealing", pp. 43–56 (1985).

Encyclopedia of Polymer Science and Technology, vol. 2, Jastrzebski, "Annealing", pp. 138–151.

Primary Examiner—Jeffery R. Thurlow
Attorney, Agent, or Firm—Edward A. Squillante, Jr.; William H. Pittman

[57] ABSTRACT

A process for reducing stresses and strains of thermoplastics is described wherein the process includes the step of heating the outer layer of the thermoplastic with a heat source to produce a resin having favorable physical and chemical properties.

12 Claims, No Drawings

PROCESS FOR ANNEALING THERMOPLASTICS

FIELD OF THE INVENTION

This invention relates to a novel process for reducing stresses and strains in thermoplastics. More particularly, the process is directed to surface annealing of thermoplastics without reducing their physical and chemical properties.

BACKGROUND OF THE INVENTION

Glasses or thermoplastics (hereinafter "thermoplastics") are often in an unstable condition due to stresses acquired during processing; particularly, cooling stages. Such thermoplastics are said to be "strained", and if the strain is excessive, the thermoplastics may crack or break into pieces when handled or utilized in their conventional manner.

Annealing is generally defined as the process for removing or diminishing the strains and stresses in thermoplastics. It is often achieved by heating the substance to be annealed and then allowing it to gradually cool. Two successful techniques often employed when annealing thermoplastics include one which withdraws the thermoplastics from a heat source, and the other which causes the heat from the heat source to diminish. Both techniques are often referred to as bulk annealing techniques since they involve heating the interior and exterior of the thermoplastics. The former is generally achieved in lehrs and the latter is generally achieved in ovens. Additional techniques for bulk annealing thermoplastics include those which employ infrared radiation. While the above-mentioned techniques assist in reducing stains in thermoplastics, they are not always desirable since bulk techniques typically result in shrinkage of the thermoplastics as well as the deterioration of the physical and chemical properties of the thermoplastics.

It is of increasing interest to reduce the stresses and strains of thermoplastics without employing bulk annealing techniques such as the above-described. Accordingly, the instant invention is directed to a process for reducing strains in thermoplastics by surface annealing which unexpectedly and simultaneously preserves the physical and chemical properties of the thermoplastics.

DESCRIPTION OF THE PRIOR ART

Attempts have been made to anneal thermoplastics. In U.S. Pat. No. 5,594,204, a process for bulk annealing thermoplastically-shaped plastic parts is described and the process comprises the step of treating the plastic parts with infrared radiation having a radiation maximum from 1200 nm to 5000 nm.

Additionally, in U.S. Pat. No. 4,128,379, an apparatus for bulk annealing hollow thermoplastic polymers is described, wherein the apparatus comprises a housing with infrared heaters spaced evenly along the periphery of said housing.

Still other investigators have focused on improving the properties of polymeric material. In German Patent 1,939,053, attempts for improving properties of polymeric material are made by heating through the entire polymeric material with, for instance, infrared and microwave ovens.

The instant invention is patentably distinguishable from the above-described since, among other reasons, it is directed to a novel process for reducing stresses and strains in thermoplastics by surface annealing said thermoplastics while unexpectedly and simultaneously preserving their physical and chemical properties. It is noted in the instant invention that surface annealing is defined as heating the outer film layer of the thermoplastic which is the external layer of the thermoplastic that is often no more than about 10 mils thick but preferably no more than about 2.0 mils thick and most preferably no more than about 1.0 mil thick.

SUMMARY OF THE INVENTION

The present invention, therefore, is based on the discovery of a novel process for surface annealing thermoplastics.

The process comprises the steps of:

(a) heating the outer film layer of a thermoplastic with a heating source, and (b) removing the heat source.

In the instant invention, there is no limitation with respect to the thermoplastics employed. Often, they include polyphenylene ethers, acrylics, polyamides, polyesters, polystyrene, polyvinyl chloride and blends prepared therefrom. However, the preferred thermoplastics employed in the instant invention are polycarbonates.

Moreover, there is no limitation with respect to the heat source being utilized in this invention other than that it does not cause the outer film layer of the thermoplastic and the internal portion of the thermoplastic to be heated to the same temperature, wherein the internal portion is defined as any part of the thermoplastic not including the outer film layer as previously defined. Thus, in the instant invention, heat may penetrate the internal portion; however, the internal portion is often about 50° C. to about 75° C. cooler than the outer film layer and preferably about 50° C. to about 100° C. cooler than the outer film layer after the outer film layer is surface annealed. Therefore, bulk annealing is prevented.

Typical heat sources which may be employed include hot plates and heated segmented belts. Microwave, convection and infrared ovens (radiation maximum greater than 5000 nm) may also be employed; however, they are not a required heat source as is often the case in many conventional processes.

It is further noted herein that there is no limitation with respect to the orientation of the thermoplastics to the heat sources employed. Therefore, the heat source and the thermoplastic may be moving, the heat source may move while the thermoplastic remains stationary or vice versa.

DETAILED DESCRIPTION OF THE PREFERRED EMBODIMENTS

The preferred polycarbonates employed in the invention may comprise structural units of the formulae

and

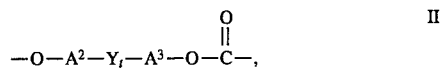

wherein II is a preferred subgenus of I and $A^1$ is a divalent substituted or unsubstituted aliphatic, alicyclic or aromatic radical, preferably —$A^2$—$Y_t$—$A^3$— wherein $A^2$ and $A^3$ are each independently a monocyclic divalent aromatic radical. Y is a bridging radical and often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene (alkylidene) radical and most often $C(R^3)_2$ wherein each $R^3$ is independently a $C_{1-5}$ alkyl and preferably a methyl group. Also included, however, are unsaturated radicals and radicals which contain atoms other than carbon and hydrogen; for example, 2,2-dichloroethylidene, carbonyl, phthalidylidene, oxy, thio, sulfoxy and sulfone and t is 0 or 1.

The $A^2$ and $A^3$ values may be unsubstituted phenylene or substituted derivatives thereof, illustrative substituents (one or more) being alkyl, alkenyl, alkoxy and the like. Unsubstituted phenylene radicals are preferred. Both $A^2$ and $A^3$ are preferably p-phenylene, although both may be o- or m-phenylene or one o- or m-phenylene and the other p-phenylene.

For reasons of availability and particular suitability for the purposes of this invention, the preferred units of formula II are 2,2-bis(4-phenylene)propane carbonate units, which are derived from bisphenol A and in which Y is isopropylidene and $A^2$ and $A^3$ are each p-phenylene.

The material represented by formula III

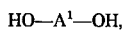     III is the source of structural units of formula I above; $A^1$ is as previously defined.

Illustrative non-limiting examples of III include:
2,2-bis(4-hydroxyphenyl)-propane (bisphenol A);
2,2-bis(3,5-dibromo-4-hydroxyphenyl)propane;
2,2-bis(3,5-dimethyl-4-hydroxyphenyl)propane;
1,1-bis(4-hydroxyphenyl)cyclohexane;
1,1-bis(3,5-dimethyl-4-hydroxyphenyl)cyclohexane;
1,1-bis(4-hydroxyphenyl)decane;
1,4-bis(4-hydroxyphenyl)propane;
1,1-bis(4-hydroxyphenyl)cyclododecane;
1,1-bis(3,5-dimethyl-4-hydroxyphenyl)cyclododecane;
4,4-dihydroxydiphenyl ether;
4,4-thiodiphenol;
4,4-dihydroxy-3,3-dichlorodiphenyl ether;
4,4-dihydroxy-3,3-dihydroxydiphenyl ether;
1,3 benzenediol; and
1,4-benzenediol.

Other useful dihydroxyaromatic compounds which are also suitable for use in the preparation of the above copolycarbonates are disclosed in U.S. Pat. Nos. 2,999,835; 3,028,365; 3,334,154 and 4,131,575, all of which are incorporated herein by reference. The preferred bisphenol is 2,2-bis(4-hydroxyphenyl)propane (bisphenol A).

The polycarbonates (homopolycarbonates or copolycarbonates) employed in the instant invention may be straight chain or branched as well as graft polymers. They may be prepared, for instance, by reacting bisphenols with a carbonate source such as phosgene or dimethyl carbonate using conventional techniques. These include melt polymerization, interfacial polymerization and interfacial conversion with bischloroformate followed by polymerization. Chain termination agents such as phenol may also be employed.

It is noted that when surface annealing the thermoplastics described in the instant invention, there is no limitation with respect to the temperature of the heat supply other than that the temperature must not be in a range which causes the temperature of the outer film layer of the thermoplastic and inner film layer of the thermoplastic to be the same. For instance, in the case of polycarbonates, the temperature of the outer film layer of the thermoplastic after surface annealing is often from about 100° C. to about 150° C. and the preferred range is generally from about 125° C. to about 135° C. The time in which the thermoplastic is subjected to the heat supply also varies with respect to the particular thermoplastic being surface annealed. Like temperature, the time of heat subjection is not limited other than that heating should cease prior to the time when the temperature of the outer film layer and internal layer of the thermoplastic is the same. In the case of polycarbonates, the heating time is often about 0.5 to about 10 minutes and the preferred range is generally from about 0.75 to about 5 minutes and the most preferred range is from about 1 to about 2 minutes. Moreover, it is noted herein that surface annealing can occur immediately after the thermoplastic is removed from an injection molder or anytime thereafter.

The following example and table provided for hereinbelow are to further illustrate and facilitate the understanding of the present invention. The data in the table has been compiled to demonstrate the unexpected physical and chemical properties displayed by thermoplastics treated in accordance with the process described in the instant invention. All entries have been prepared in a manner similar to the one described in said example.

EXAMPLE

Bisphenol A polycarbonate ($M_w$=25,000 determined by measuring viscosity in methylene chloride at 25° C.) plates (150 mm × 12.7 mm × 3.1 mm) were injection molded in a 30 ton injection molding machine using a cold mold (85° F.). Immediately after molding, the plates were surface annealed for 1 minute using a hot plate set at 135° C. Subsequent to surface annealing, no crazes or cracks were observed and the surface annealed plates were then exposed to a mixture of 45% by weight iso-octane and 55% by weight toluene for 3 minutes. The plates were removed from the mixture and, again, no crazes or cracks were observed indicating solvent resistances. The notched Izods of the plates were recorded to be 16 ft-lbs/in.

TABLE

| Entry | Surface Annealing | | Crazes/cracks[d] after solvent contact | Impact Resistance (ft-lb/in) |
|---|---|---|---|---|
| | Time (sec) | Temperature (°C.) | | |
| 1 | 120 | 130 | N | 16.2 |
| 2 | 180 | 130 | N | — |
| 3 | 240 | 130 | N | — |
| 4[a] | 300 | 135 | N | — |
| 5[b] | — | — | Y | 16.4 |
| 6[c] | 1800 | 135 | N | 1.5 |

[a]Polycarbonate was surface annealed 24 hours after removal from the injection molder.
[b]Unannealed control.
[c]Bulk annealed polycarbonate.
[d]Samples analyzed after solvent contact for 60, 120 and 180 seconds.

What is claimed is:

1. A process for surface annealing thermoplastics comprising the steps of:
   a. heating with a heating source an outer film layer of a thermoplastic consisting of said outer film layer and an internal portion; and
   b. removing said heat source, wherein said outer film layer of the thermoplastic is no more than about 10 mils thick and said internal portion is about 50° C. to about 100° C. cooler than said outer film layer after surface annealing.

2. A process for surface annealing thermoplastics in accordance with claim 1 wherein said outer film layer of the thermoplastic is no more than about 2.0 mils thick.

3. A process for surface annealing thermoplastics in accordance with claim 2 wherein said outer film layer of the thermoplastic is no more than about 1.0 mil thick.

4. A process for surface annealing thermoplastics in accordance with claim 1 wherein said heating source is a hot plate, heated segmented belt, or microwave oven.

5. A process for surface annealing thermoplastics in accordance with claim 1 wherein said heating source is a convection oven or infrared oven.

6. A process for surface annealing thermoplastics in accordance with claim 1 wherein said thermoplastic is a polycarbonate.

7. A process for surface annealing thermoplastics in accordance with claim 6 wherein said thermoplastic is heated to a temperature from about 100° C. to about 150° C.

8. A process for surface annealing thermoplastics in accordance with claim 7 wherein said thermoplastic is heated to a temperature from about 125° C. to about 135° C.

9. A process for surface annealing thermoplastics in accordance with claim 6 wherein said thermoplastic is heated from about 0.5 to about 10 minutes.

10. A process for surface annealing thermoplastics in accordance with claim 6 wherein said polycarbonate comprises structural units of the formula

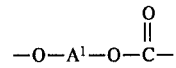

and $A^1$ is a divalent substituted or unsubstituted aliphatic, alicyclic or aromatic radical.

11. A process for surface annealing thermoplastics in accordance with claim 10 wherein $A^1$ is $-A^2-Y_t-A^3-$ and $A^2$ and $A^3$ are each independently a monocyclic divalent aromatic radical and Y is a bridging radical and t is 0 or 1.

12. A process for surface annealing thermoplastics in accordance with claim 10 wherein said polycarbonate is a bisphenol A polycarbonate.

* * * * *